United States Patent Office 3,350,196
Patented Oct. 31, 1967

3,350,196
BASIC STEELMAKING
Roy Wardle Bashford, Newcastle, New South Wales, Australia, assignor to BOT Brassert Oxygen Technik A.G., Zurich, Switzerland, a company of Switzerland
No Drawing. Filed July 20, 1965, Ser. No. 473,518
Claims priority, application Australia, July 20, 1964, 47,107/64
2 Claims. (Cl. 75—52)

ABSTRACT OF THE DISCLOSURE

This invention relates to the refining of crude iron to produce steel in which calcium carbide is added to a charge of crude iron and iron scrap and blowing the charge with oxygen to refine the charge, the calcium carbide serving to supply additional exothermic heat for melting a larger than normal amount of scrap and supply calcium oxide for slagging purposes.

---

This invention relates to basic steelmaking processes more particularly to the use of a novel flux in such processes.

Broadly in accordance with the present invention there is provided a process of refining pig iron by introducing oxygen from above under addition of $CaC_2$ characterized by the fact that $CaC_2$ is added at the beginning of the process in order to replace the lime completely or in part and to supply additional heat to the charge for the purpose of increasing the amount of solid charging materials, such as scrap.

The invention is based on the discovery that by virtue of the exothermic nature of the carbide reaction as opposed to the endothermic nature of burnt lime or limestone, significantly greater percentages of steel scrap or other coolants may be used.

Whereas it has already been proposed to add calcium carbide in basic steelmaking processes, the addition has been made during the last phase of the process as a carburizing and deoxidizing agent, a heating of the charge and an addition of scrap as envisaged in accordance with the present invention being out of question at so late a time.

When calcium carbide is oxidised in the high temperature environment of steelmaking processes it forms lime (CaO), which can be used as the foundation of the basic slag, and carbon monoxide and/or carbon dioxide each of which products create considerable heat. The bulk of the heat release is due, however, to the oxidation of calcium and is gainfully utilized within the system.

In a small scale basic oxygen steelmaking furnace capable of using a maximum of 13% coolant steel scrap it was found that if calcium carbide was substituted for burnt lime the scrap using capacity increased to 55%.

It has also been found that in a 48 ton basic open hearth furnace the pig component of all cold charges can be replaced by steel scrap if calcium carbide is used instead of limestone as the flux.

In addition, the technical feasibility of using basic steelmaking charges consisting all or in part of iron ore, coal and calcium carbide has been postulated.

The following examples of the use of calcium carbide in a small scale basic top jet oxygen steelmaking vessel demonstrates one of the uses to which this invention may be put.

The procedure adopted was to compare results for experimental production of steel using calcium carbide flux with normal heats of steel using burnt lime flux. The aim was to establish the amount of steel scrap which can be used and still give steel finishing temperatures of about 1620° C.

In all cases the charge was blown to the drop of the flame and had carbon contents of approximately .03%.

The hot metal, steel and slag of all heats were sampled for analysis and the hot metal and steel temperatures recorded by rare metal immersion pyrometry.

The average results from 7 consecutive and normal steel heats using burnt lime as the flux are shown in Table 1 appended.

In a series of 7 consecutive heats incorporated calcium carbide in lieu of burnt lime, but with increasing percentages of steel scrap and a fixed quantity of hot metal, and oxygen flow rate proportion to the extra fuel introduced as carbide, this latter to maintain similar blowing times and reasonably constant heat losses.

Scrap consumption was as under:

| Heat No. | Percent Steel Scrap | Steel Temp., ° C. |
|---|---|---|
| 1 | 27.6 | 1,772 |
| 2 | 29.0 | 1,735 |
| 3 | 30.4 | 1,661 |
| 4 | 34.9 | 1,638 |
| 5 | 36.3 | 1,638 |
| 6 | 39.5 | 1,635 |
| 7 | 41.25 | 1,572 |

Details for heats 1 and 6 are also shown in Table 1.

This series of tests showed that 39.5% of scrap could be used and requisite tapping temperature maintained.

The steels produced in this series contained higher sulphur content than normal heats due to the lower lime to silica ratio slags and the high sulphur content of the low grade calcium carbide used, which analysed:

$SiO_2$: 5.5; $Fe_2O_3$: 1.5; $Al_2O_3$: 2.3; $CaC_2$: 61.0; Free CaO: 26.6; MgO: .3; Free C: .28; S: .50; P: .01; Ig. Loss: 1.4.

As compared with the 17.2 lbs. of available CaO in the 20 lbs. of burnt lime used in normal heats, the 20 lbs. of low grade carbide used in the test heats provided only 12.6 lbs. and a second series of heats using much less hot metal with proportionate amounts of carbide and increased scrap percentages gave the following results:

| Heat No. | Percent Steel Scrap | Steel Temp., ° C. |
|---|---|---|
| 1 | 42 | 1,665 |
| 2 | 44 | 1,624 |
| 3 | 55 | 1,616 |

Details for heat 3 of this series are also shown in Table 1.

It will be noted that with the higher lime to silica ratio slag the sulphur in the tapped steel was similar to the normal heats despite the relatively high sulphur in the hot metal and the high sulphur content of the carbide.

It is claimed that in basic steelmaking equipments if the normal burnt lime or limestone flux is replaced by calcium carbide a more favourable heat balance exists which permits the use of significantly increased percentages of coolants such as steel scrap, cold pig iron, iron ore, sinter or pellets.

TABLE 1.—SMALL SCALE BASIC TOP JET OXYGEN STEEL MAKING

|  | Normal Heats (avg. of 7 heats) | Carbide Heats, Series 1 | | Carbide Heats—Series 2, Heat 3 |
|---|---|---|---|---|
|  |  | Heat 1 | Heat 6 |  |
| Charge, lbs.: |  |  |  |  |
| Scrap | 45 | 105 | 180 | 230 |
| Hot Metal | 296 | 276 | 276 | 189 |
| CaO (Burnt Lime) | 20 | 0 | 0 | 0 |
| Carbide | 0 | 20 | 20 | 20 |
| NaF | ¾ | 1½ | 1½ | 1½ |
| Scrap, percent | 13.2 | 27.6 | 39.5 | 55 |
| Blow Time, Mins., Secs | 21.00 | 22.41 | 24.53 | 18.00 |
| Oxygen: |  |  |  |  |
| C.f., min | 12.4 | 18.5 | 18.5 | 27 |
| C. ft | 260 | 419 | 461 | 486 |
| Hot Metal: |  |  |  |  |
| C | 4.07 | 4.17 | 4.17 | 4.15 |
| P | .103 | .100 | .095 | .084 |
| Mn | .67 | .68 | .66 | .62 |
| Si | .80 | .73 | .68 | .79 |
| S | .043 | .045 | .050 | .053 |
| T., °C | 1,346 | 1,404 | 1,346 | 1,335 |
| Steel: |  |  |  |  |
| C | .03 | .04 | .04 | .02 |
| P | .006 | .023 | .006 | .005 |
| Mn | .12 | .07 | .06 | .02 |
| Si | .021 | .005 | .07 | .020 |
| S | 0.27 | .037 | .045 | .029 |
| T., °C | 1,628 | 1,772 | 1,635 | 1,616 |
| Slag: |  |  |  |  |
| CaO/SiO$_2$ | 2.9 |  | 1.8 | 3.9 |
| S | .175 |  | .12 | .169 |
| (S)/[S] | 6.5 |  | 2.6 | 5.8 |

What I claim is:
1. A process of producing steel comprising preparing a charge of liquid pig iron and solid scrap, said pig iron containing oxidizable impurities and said scrap being added in an amount larger than that amount which is liquifiable by the heat liberated during the combustion of said impurities, adding calcium carbide to said charge as a combined basic slag-forming and heat-generating agent, and blowing said charge with oxygen at a rate sufficient to maintain oxidizing refining conditions, whereby calcium carbide is decomposed to produce exothermic heat and provide calcium in the form of CaO dissolved in the slag and carbon partly dissolved in the melting charge, and continuing blowing until the carbon contained in the charge is substantially removed and the tapping temperature is attained.

2. A process as set forth in claim 1, wherein the charge is composed of 13 to 55% scrap and 87 to 45% liquid pig iron.

References Cited

UNITED STATES PATENTS

| | | | |
|---|---|---|---|
| 2,049,004 | 7/1936 | Flannery | 75—55 |
| 2,669,511 | 2/1954 | Whitney | 75—43 |
| 2,734,818 | 2/1956 | DeLaval | 75—43 |
| 2,870,004 | 1/1959 | Estes et al. | 75—51 |
| 2,992,097 | 7/1961 | Spence | 75—55 |

FOREIGN PATENTS 848,567   9/1960   Great Britain.

BENJAMIN HENKIN, *Primary Examiner.*